July 13, 1948.   F. A. HAYES   2,445,066
THRUST SUSTAINING MEANS FOR VARIABLE
SPEED DRIVE MECHANISM
Filed Oct. 22, 1946   2 Sheets-Sheet 1
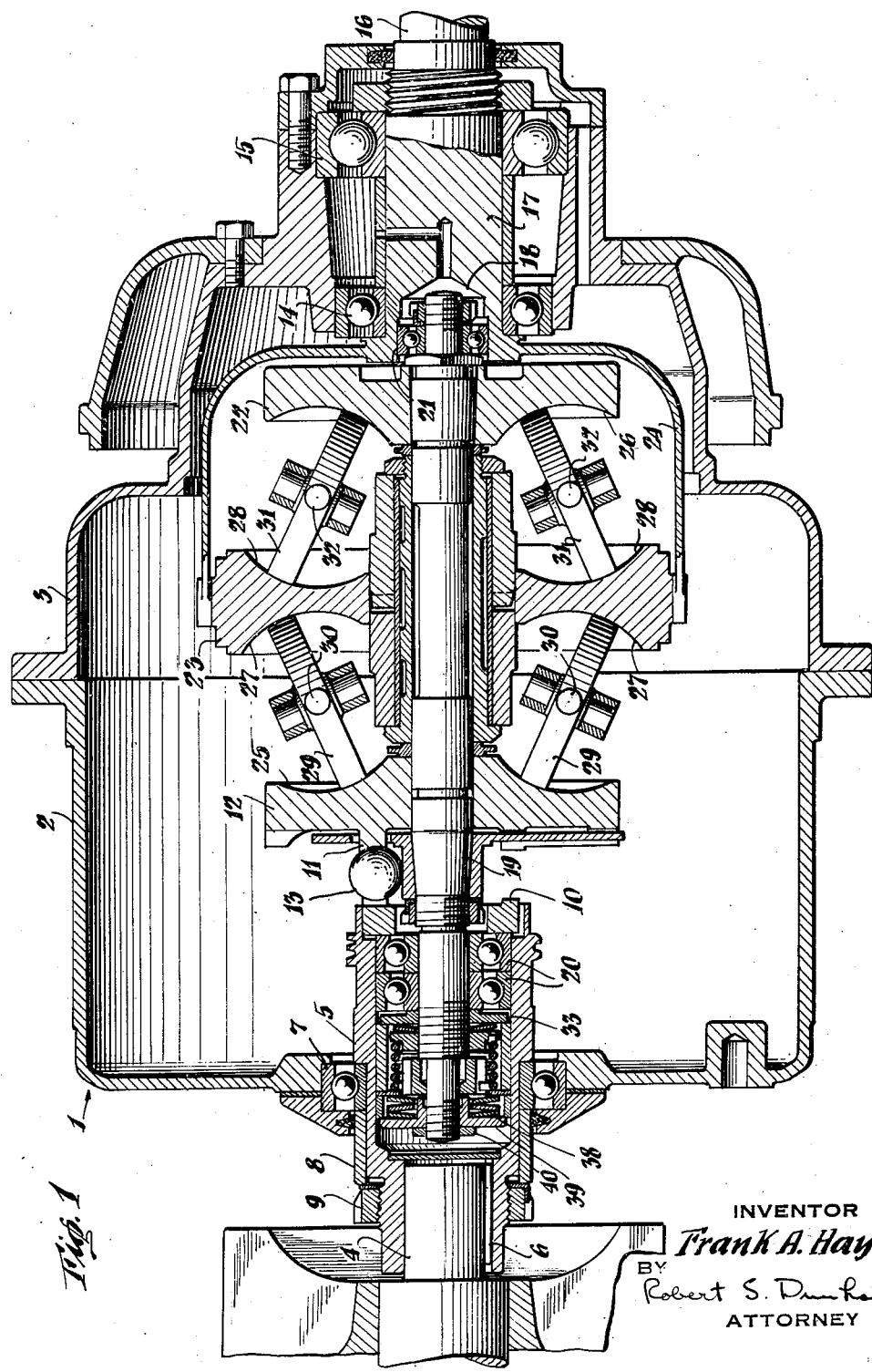
INVENTOR
*Frank A. Hayes*
BY
*Robert S. Dunham*
ATTORNEY

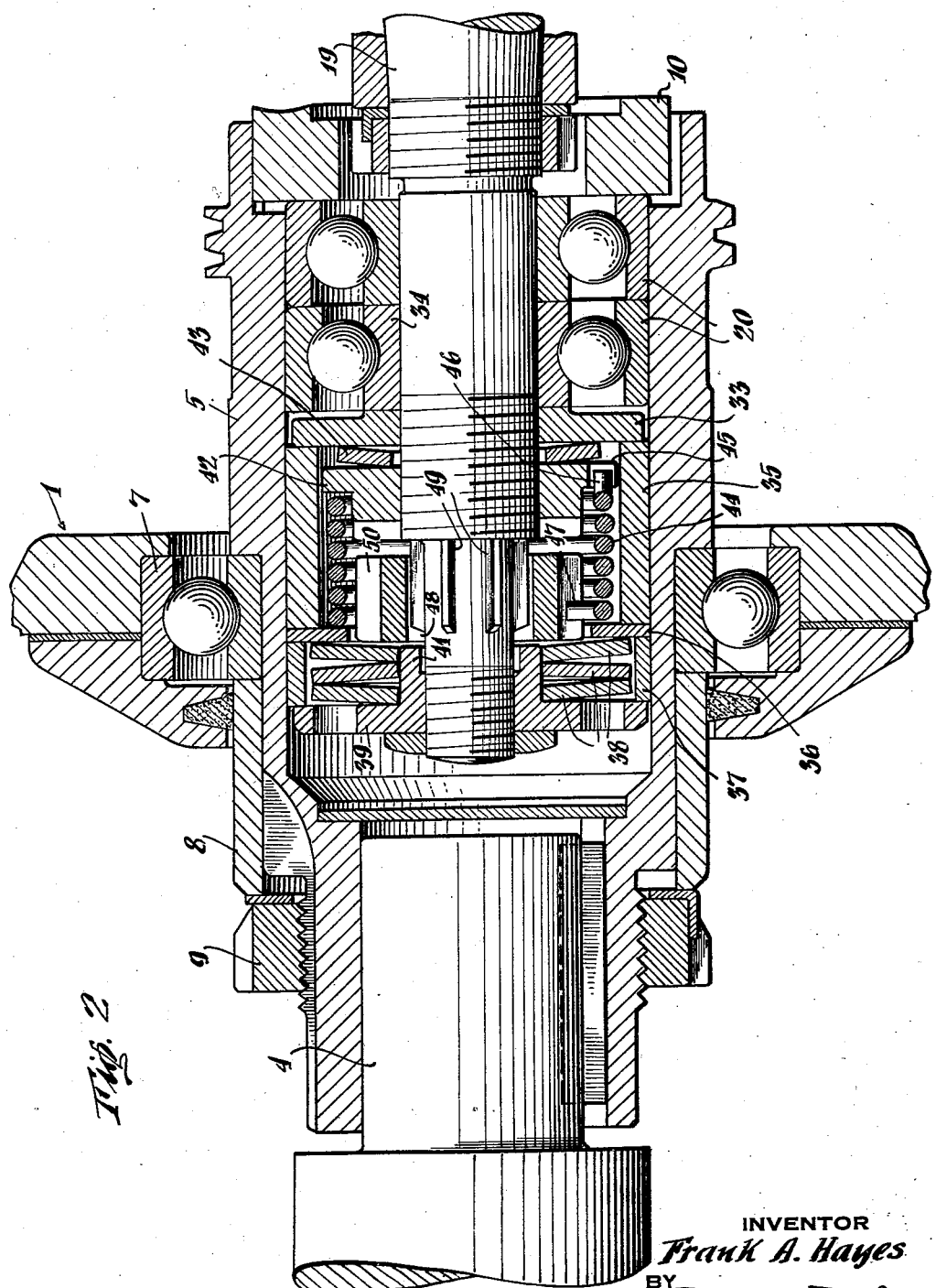

Patented July 13, 1948

2,445,066

UNITED STATES PATENT OFFICE 2,445,066

THRUST SUSTAINING MEANS FOR VARIABLE SPEED DRIVE MECHANISM

Frank A. Hayes, Middletown, N. J.

Application October 22, 1946, Serial No. 704,851

12 Claims. (Cl. 74—200)

The present invention relates to thrust sustaining means for variable speed drive mechanism and more particularly to thrust sustaining means applicable to variable speed drive mechanism of the type including concentric driving and driven discs in which there are at least one of each type and wherein there are so-called "precessing rollers" intermediate the driving and driven discs for the transmission of power therebetween, the speed change effected by the device being determined by the angle of precessing of the rollers. Such devices form the subject matter of various patents heretofore granted to me, these patents being Nos. 1,540,124, 1,698,229, 1,865,102, 1,919,218 and 2,201,176.

While devices of this character have been constructed and found to operate successfully in various different types of installations and with different ratings as to power capacity, certain difficulties have arisen, particularly after long continued use of such devices, due to the gradual but progressive wearing of some of the parts. Under such conditions the end thrust, which has heretofore been sustained by more or less conventional means, has been found to change over the life of the apparatus due to the wearing of the parts, so that after a substantial time period of use the operation has been rendered somewhat less efficient. A primary general object of the invention is to provide means for the compensation of the effects of this wear in the end thrust sustaining means in a particular manner, and peculiar to the above identified type of apparatus.

More particularly, it has been found that the cam and ball mechanism, which acts as a pressure device for applying the pressure to the driving and driven surfaces, to insure traction under all loading conditions, and which device is shown, for example, in Fig. 18 of my prior Patent No. 2,201,176, has had to act somewhat differently or to a greater extent after substantial wear of the parts of the mechanism as a whole than when such mechanism was initially built and operated. This cam and ball mechanism acts as a more or less tortionally flexible coupling between the driving devices and driven discs of the transmission. The cam itself acts like a nut with a ball bearing thread which clamps the discs and rollers together. It has been found highly desirable if not necessary in the use of such devices to keep the angular movement of the cam, which is required to produce the necessary driving pressure, to a minimum. One of the specific objects of the present invention is to provide auxiliary thrust-pressure-sustaining means which will secure this end.

Also, any substantial play or slack in the entire mechanism permits a corresponding free relative motion between the driving device on the one hand and the transmission and load on the other. Hence, when the slack is all taken up, a considerable difference in speed may exist between the driving device and the drive shaft of the transmission. In order to bring these two elements of the drive to the same speed again, the ball cam mechanism above referred to must move further than required by the normal driving torque and exert considerable excess torque on both elements. Where the initial loads are heavy and particularly where a reversal of torque occurs, as in a rapid change to a lower speed ratio, the load inertia, acting as a flywheel, tries to drive the driving device at higher than its normal speed thus doubling the normal movement in the pressure device and the stresses in the cam may become excessive, so as to damage the cam or cause other failure of the drive. The present invention has as a further general object to overcome the difficulties here referred to.

Among the more particular objects of the present invention are to provide spring means for sustaining or accommodating the basic or no-load thrust of the driving shaft in respect to a housing, wherein the drive shaft is in effect rigid with at least one of the driving discs and the housing in effect rigid with the driven disc or discs, or as particularly shown, with another and axially movable driving disc, so as to provide the necessary pressure between these discs to insure adequate traction between them and the precessing rollers as hereinafter more particularly set forth. It is a further particular object to limit the thrust-sustaining force afforded by this spring device to substantially a predetermined amount, which in practice is calculated as being substantially that equivalent to the no-load requirements. In conjunction with this, it is a particular object of the present invention to provide auxiliary means for sustaining thrust which will compensate for the excess of thrust load over no-load conditions. A further detailed object of the present invention is to provide for this latter thrust sustaining means an annular nut threaded on one of the relatively movable members, consisting of the driving shaft and the housing as aforesaid, wherein means are provided for taking up on this nut automatically during the operation of the mechanism to compensate for changes incident to wearing of the parts.

A further detailed object of the invention is to provide spring loading means associated with this nut for the purpose of providing the additional resilient force for sustaining thrust in addition to that force provided by the first named (no-load sustaining) means aforesaid.

A further specific object of the invention is to provide means, particularly a tortion spring, for taking up automatically on the nut aforesaid whenever such action is permitted to provide a necessary tension upon wearing of the parts, and wherein means are provided for affording a predetermined initial tortional stress on this spring, which may be provided as a set-up adjustment in the construction of the device to provide desired characteristics to the automatic adjustment during the subsequent use and operation thereof.

Other and more detailed objects of the present invention will become apparent from the following particular description of the preferred embodiment thereof and from the appended claims, when taken in connection with the accompanying drawings in which:

Figure 1 is a view substantially in central longitudinal section showing a speed change device of the general type disclosed in my prior patents and with the present invention applied thereto, many of the control parts and other structural parts disclosed in my prior patents being omitted for the purposes of clearness; and Fig. 2 is an enlarged fragmentary section similar to a portion of Fig. 1 illustrating more clearly the subject matter of the present invention.

The general construction of the speed change device to which the present invention is applied is set forth in detail and described as to both its construction and operation in my prior patents, aforesaid, and particularly in Patent No. 2,201,176, wherein see especially Figs. 6 to 12, inclusive. Briefly and generally, this construction includes a driving shaft which, during normal operation, has rigid therewith two spaced driving discs, substantially centrally intermediate which is a driven disc. Each of the driving discs and the driven disc have facing one another respectively annular depressions or channels which are formed in a special manner as set forth in my prior patents and between which are provided precessing rollers. The angles at which these rollers are arranged will determine the relative speeds of the driving and driven discs during operation. It becomes important in structures of this kind to provide an effective pressure between the discs and the rollers, so as to insure traction for the transmission of power therebetween. The present invention relates particularly to the thrust means by which this pressure may be established and maintained.

Turning now to the accompanying drawing and particularly to Fig. 1, thereof, there is shown a housing 1, comprising parts 2 and 3, suitably joined together, in which the transmission parts are located. A drive or input shaft 4, from any suitable source of power, has keyed thereto an annular shell 5 by a key 6, so that the shell 5 is positively rotated by the drive or input shaft 4. Intermediate the shell 5 and the housing 1 is a ball bearing means generally indicated at 7, the inner portion of which, rigid with the shell 5, being secured in position by an annular collar 8 held in position by a nut 9 threaded on the shell as shown. At its inner end shell 5 has non-rotatably secured therein by suitable spline means (not shown) an outer cam member 10 which cooperates to drive an inner cam member 11 formed as an annular projection upon an axially movable driving disc 12. These cam members 10 and 11 are formed with alternate rises and depressions and locate therebetween a plurality of balls 13.

Suitably journalled in the other end of the casing 1 by a pair of ball bearings 14 and 15 is a driven or output shaft 16 and certain associated bearing means and mechanism, forming no part per se of the present invention. The driven or output shaft 16 has an enlarged portion 17, which latter has a depression or counterbore 18 concentrically disposed therein and arranged to receive the right hand end, as shown in Fig. 1, of a central driving shaft 19 for the transmission. The left hand end of this driving shaft 19 is carried in a pair of cooperating thrust resisting type ball bearings 20, which are arranged within the shell 5 as shown and which are particularly arranged to form a part of what may be termed a "housing" for the transmission of thrust forces to the outer cam member 10 and thence through the balls 13 and inner cam member 11 to the driving disc 12. The right hand end of the drive shaft 19 is provided with suitable bearing means shown at 21 within the depression or counterbore 18. Adjacent to this right hand end of the shaft 19 there is a driving disc 22 which is suitably secured to the shaft 19 in a rigid position, for example by providing a tapered end portion of the shaft as shown, which seats firmly in the center, complementarily tapered bore in the disc 22. Substantially midway between the discs 12 and 22 is a driven disc generally indicated at 23. The disc 23 is non-rotatably secured to the shaft 17—16 through an annular shell 24 for the transmission of power thereto. The disc 23 is rotatable in respect to the shaft 19 and parts carried thereby in a suitable manner, per se forming no part of the present invention. The discs 12 and 22 have annular curved surfaces 25 and 26, respectively, and the disc 23 has substantially corresponding curved surfaces on its opposite sides as shown at 27 and 28. Intermediate the driving surfaces 25 and 27 is an annular series of precessing rollers as shown at 29, mounted in suitable carriers and freely rotatable in respect thereto.

These carriers are further rotatable about precessing axes here shown as the points 30. These axes in the positions of the parts shown in Fig. 1 are perpendicular to the plane of the drawing. The axes about which rollers 29 rotate in their carriers lie in a common plane respectively with the axis of the shaft 19. Furthermore, in any section or common plane, taken centrally through the axis of rotation of any of the rollers 29 and the axis of the shaft 19, the curves of the surfaces 25 and 27 will be semi-circular, having as their common center the intersection of the precessing axis 30 with the common plane, in the normal driving position of the precessing rollers, i. e., when there is no speed change being made, but any one consistent speed is being transmitted, irrespective of that speed. One means by which the precessing angle of the rollers, i. e., the angles of disposition of the rollers about their precessing axes 30, is adjusted so as to adjust the speed ratios between the driving and driven shafts 4 and 16 is disclosed in detail in my prior patents aforesaid, see particularly Patent No. 1,698,229, wherein the theories of operation are set forth in detail and form no part of the present invention. The mechanism for accomplishing these results is not disclosed in the accompanying drawing as it would only serve to complicate this drawing and would add nothing to the disclosure of the present invention.

Similarly arranged between the surfaces 26 and 28 are a second annular series of precessing rollers 31, similar to the rollers 29 and arranged to precess about axes 32 in the same manner as previously described for the rollers 29 and described in my prior patents aforesaid.

It will be understood that in a drive of the character generally disclosed in the present application, the precessing angle of the rollers 31 will be substantially equal to and reverse from that of the rollers 29, so that, the rollers 29 and 31 being preferably of the same diameter, there will be an equal speed ratio between the discs 12 and 23 as between the discs 22 and 23.

In order to provide for necessary pressure between the driving and driven discs 12 and 22, on the one hand, and 23, on the other, through the rollers 29 and 31, the disc 12 is movable axially of the shaft 19 in a limited range but is secured against rotation in respect to the shaft 19 by spline means. Means are provided, as hereinafter set forth, for moving the disc 12 toward the disc 22 with a pressure necessary for the effective transmission of power as aforesaid. For this purpose, as taught in my prior patents, there is provided initially a slight relative angular rotation about the common axis of shafts 4 and 19, and therewith between the rear cam means 10 and the forward cam 11, thus tending by the alternate depressions and the projections of these cams, which are gradual in their change, and the balls 13 to cause the balls to move up hill until a desired pressure is reached between the parts as aforesaid by the relative axial movement of the driving disc 12 and shaft 19 carrying disc 22. This movement of the disc 12 should be relatively slight in practice for, as aforesaid, the cam mechanism 10, 11, 13, acts like a nut having a ball bearing thread for clamping the discs and rollers together; and it has been found substantially necessary to keep the angular relative movement between the cams 10 and 11 at a practical minimum. It will be seen that if or when the parts, for example the surfaces 25, 26, 27 and 28 and the roller 29 and 31, wear to any substantial extent, a greater movement of the disc 12 to the right will be required in order to attain a given pressure, which would require a greater relative angular movement between the cams 10 and 11. It is to minimizing this angular movement, and hence the axial movement of the disc 12, to which the present invention is particularly directed. It will be understood that the portions of the device thus far described by reference to the accompanying drawing, Fig. 1, are all described substantially in greater detail in my prior patents aforesaid, the details of the present invention remaining to be described.

Means are provided in accordance with the present invention for sustaining the no-load thrust of the operating parts of the apparatus, i. e., for providing the minimum necessary axial clamping action between discs 12 and 22. For this purpose there is particularly provided means including compression springs intermediate the shaft 19 on the one hand and the "housing" so-called associated with the left hand end of this shaft and which is in fact made up of a plurality of parts. As shown, the so-called housing may include the thrust bearing means 20, which are axially slidable in respect to the shell 5, a loose washer means 33 which bears, as seen best in Fig. 2, on the inner portions 34 of the thrust bearing 20 which rotate with the shaft 19, but are axially slidable in respect thereto. This housing also includes a loose annular sleeve 35 bearing upon the outer periphery of the washer 33, a loose ring 36, and a loose sleeve 37 bearing upon the ring 36. The sleeves 37 and 35 and the ring 36 are loosely positioned inside the shell 5 and are rotatable in respect thereto with the shaft 19. For the purpose of providing this minimum or no-load thrust-sustaining force, there is provided a spring means here shown as comprising a plurality of dished washers 38, which are sometimes known as Belleville washers, these washers being arranged concentric with the shaft 19 and being confined between the ring 36 forming a part of the so-called housing and a nut 39 threaded on the end of the shaft 19. The nut 39 is locked in position by a suitable lock nut 40. The nut 39 has an inwardly projecting collar portion 41 serving merely to position the washers or spring means 38 substantially concentric with the shaft 19. It will be understood that all the parts 34—41 inclusive rotate with the shaft 19 during the normal operation of the device while the outer ring portions of the thrust bearing means 20 rotate with the shell 5, relative rotation being permitted by the balls forming parts of the thrust bearing means 20. Inasmuch as the spring means or Belleville washers 38 are positioned as shown, their maximum compression will be determined by the length of the annular sleeve 37, which is preferably ground to an accurate length, so that the compression of these springs 38 will be predetermined to be an amount substantially sufficient to afford no-load thrust requirements for the apparatus. It will be seen that when the nut 39 is pulled up to the extent permitted by the length of the sleeve 37 and locked in position by the lock nut 40, there will be a predetermined compressive force determined by the springs 38 and therethrough via the elements 39, 36, 35, 33 and 34 and the thrust bearing 20, onto the outer cam member 10, and through tension in shaft 19 to disc 22, rollers 21, disc 23, rollers 19 and disc 12 to the inner cam 11.

Means are further provided, in accordance with the present invention, for sustaining the over-no-load thrust requirements for the apparatus. For this purpose there is shown an annular nut 42 which may be threaded upon a part of the shaft 19, as shown, and which is operated upon parts of or rigid with the so-called housing by spring means here shown as a single dished or Belleville washer spring 43, located concentric with the shaft 19 and intermediate the nut 42 and the loose washer 33. Thus for any given position of the nut 42, there will be a predetermined compression effective upon the spring means 43 tending to cause relative axial movement between the shaft 19, with which the nut is rigid, on the one hand, and the housing including as a part thereof the washer 33, on the other. In this connection, it is to be considered within the purview of this invention that the nut 42 and spring means 43 associated therewith could be in effect reversed, so that the nut could be threaded on the housing and could serve to push against a part axially rigid with the shaft 19. The manner of providing such reversal of parts will be obvious to those skilled in the art from the present disclosure and hence is not particularly illustrated.

Inasmuch as it is desired as aforesaid to provide means by which the desired axial pressure may be afforded, while at the same time compensating for different positions of the parts when subject to such pressure and incident to the wearing of the parts, means are provided in accordance with the present invention for adjusting the position of the nut 42 in respect to that member upon which it is threaded, in this instance in respect to the shaft 19. For this purpose there is provided a tortion spring 44 tending at all times to rotate the nut in a direction to increase the compression upon the spring 43. This tortion spring from a broad point of view has one end anchored in the nut 42 and the other end non-rotatably anchored in respect to the part, here the shaft 19, upon which the nut is threaded.

From the above description of the action of spring 44 and nut 42 it will be understood that it is desired in this connection to be able adjustably to determine the initial tortion of the spring 44 as a set-up adjustment. In the construction shown in the drawings, three separate means are provided for accomplishing this adjustment, each of which would be to some extent at least effective alone for this purpose, but all of which together afford a larger number of possible variations of the adjustment than any one such means. The provision of any one or more of these means is to be considered within the purview of the present invention, even though the provision of more than one such means will in practice afford a larger number of possible adjustments than could probably reasonably be provided by the provision of but one such means.

The first of these means for affecting this adjustment is the provision of a plurality of spring-and-receiving recesses arranged as an annular series about the periphery of the nut 42. One of these recesses is shown at 45 in which one end of the spring 44 is shown located at 46. It will be understood that by providing a suitable number of recesses 45 preferably arranged uniformly in an annular series about the periphery of the nut 42, the tortion of the spring 44 may be adjusted to a number of different positions or adjustments determined in part at least by the number of such recesses, assuming for this purpose that but one complete turn in the rotation of one end of the spring with respect to the other is the maximum desired range of adjustment.

A second means providing for the adjustment of the spring 44 is as shown by anchoring the rear end of this spring here shown at 47 in a collar 48, which collar is non-rotatably carried by a part of the shaft 19. As shown, this collar is splined on the shaft by the provision of a plurality of substantially equi-angularly disposed splines 49. Assuming then that the end 47 of the spring 44 is always located in a single predetermined position in respect to the collar 48, the torsion of the spring may then be adjusted by adjusting the rotated portion of the collar 48 with respect to the shaft 19 and the adjustment secured by the splines 49, the collar being arranged for non-rotative association with the shaft in a plurality of adjusted positions, determined in practice by the number of such splines.

The third arrangement shown for adjusting the torsion of the spring 44 is by the provision of a plurality of spring-and-receiving recesses in the periphery of the collar 48, these recesses preferably being in an arrangement comprising a uniformly disposed annular series and the recesses being per se shown as radial slots 50 in this collar. There is thus provided a possible series of adjustments depending upon which of the spring-end-receiving recesses 50 is used for locating the end 47 of the spring 44, the possible number of such adjustments provided being subject to the same qualifications above set forth in discussing the recesses 45 in the nut 42.

If now it is desired to afford a large number of different adjustments, this may be accomplished by providing a number of recesses 50 and a number of recesses 45 which are prime to one another, for example 5 and 7. The same general results could be obtained by providing a number of splines 49 different from and prime in respect to the number of recesses 45 or 50. Furthermore, all three of these numbers might be arranged to be prime to one another to give a maximum possible number of adjustments, for example 3, 5 and 7 would give an adjustment of approximately three degrees.

By the provision aforesaid, it will be seen that as the parts of the apparatus, forming the subject matter of my prior patents and as generally described hereinabove, are operating over a period of time with a certain amount of resulting wear on the parts, there would be required a greater relative movement to the right as seen in Fig. 1 of the disc 12 and/or to the left of shaft 19 in order to secure the same pressure conditions upon the rollers 29 and 31 to give a desired transmission of a predetermined amount of power. This in turn would require, were it not for the special provisions of the present invention, a greater relative movement between the cams 10 and 11, so that the balls 13 would have to ride further up on the raised or inclined portions of these cams. As this is not desired, means are provided in accordance with the present invention for taking up upon the position of the cam means 10 to compensate for this wear and still provide desired thrust sustaining forces, tending to move the discs 12 and 22 toward one another. This means includes the nut 42, which is progressively screwed to the right as seen in two figures of the drawings to take up for this wear. It has been found that the means set forth in the foregoing description and shown in the accompanying drawings adequately fulfills these requirements and serves in practice to compensate for an otherwise troublesome situation, which is not immediately felt when operating structures built in accordance with prior art teachings, but which develops after long, continued use and particularly when subject to heavy loads and frequent substantial changes in speed ratio between the driving and driven shafts.

While there is herein shown and described but one embodiment of the present invention, some variants thereof have been suggested and others will occur to those skilled in the art from the foregoing teachings, I do not wish to be limited, therefore, except by the scope of the appended claims, which are to be construed validly as broadly as the state of the prior art permits.

What is claimed is:

1. In a variable speed transmission mechanism of the type having coaxial driving and driven discs and precessing rollers therebetween for transmission of power at variable speed, and having a driving shaft secured to at least one of said discs and a coaxial housing arranged by relative axial movement in respect to said shaft to provide thrust pressure required for the effective functioning of said transmission mechanism, the improvement which comprises, means including at least one compression spring tending to move said shaft axially in respect to said housing with a force sufficient substantially to provide no-load thrust force requirements for said mechanism, an annular nut threaded on said shaft for axial movement in respect thereto upon rotation, spring means interposed between said shaft and a part rigid with said housing so that upon tightening of said nut, its associated spring means will act substantially in parallel with the first named means in tending to move said shaft axially in respect to said housing and to provide the thrust force requirements for said mechanism, and a torsional spring coaxial with said shaft and having one end carried by said annular nut and the other end non-rotatably secured in respect to said shaft, said torsional spring being so constructed and arranged as to tend to rotate said annular nut in a direction to increase the load on its associated spring.

2. The improvement in a variable speed transmission mechanism in accordance with claim 1, wherein said first named means comprises a plurality of dished Belleville washers effective in compression to provide no-load thrust force requirements.

3. The improvement in a variable speed transmission mechanism in accordance with claim 1, wherein said first named means comprises a plurality of dished Belleville washers interposed between said shaft and said housing and effective in compression to move said shaft in respect to said housing to provide no-load thrust force requirements, and an annular collar concentric with said Belleville washers for limiting the compression thereof and thereby for limiting the thrust force provided by such compression to a value sufficient substantially to provide for no-load thrust force requirements for said mechanism.

4. In a variable speed transmission mechanism of the type having coaxial driving and driven discs and precessing rollers therebetween for transmission of power at variable speed, and having a driving shaft secured to at least one of said discs, and a coaxial housing arranged by relative axial movement in respect to said shaft to provide thrust pressure required for the effective functioning of said transmission mechanism, the improvement which comprises, means including at least one compression spring tending to move said shaft axially in respect to said housing with a force sufficient substantially to provide no-load thrust force requirements for said mechanism, an annular nut threaded on said shaft for axial movement in respect thereto upon rotation of said nut, spring means associated with said nut, interposed between said nut and said housing and effective upon the tightening of said nut to augment the thrust resistance provided by the first-named means including said compression spring, a torsional spring coaxial with said nut and having one end carried by said nut and the other end non-rotatably carried in respect to said shaft and tending to rotate said nut to stress its associated spring so as to provide over-no-load thrust force requirements for said mechanism, and means for adjustably predetermining the initial torsion of said torsional spring in tending to rotate said nut.

5. The improvement in a variable speed transmission mechanism in accordance with claim 4, comprising in addition, a collar for holding said other end of said torsional spring, and wherein said means for adjustably predetermining the initial torsion of said torsional spring comprises means by which said collar is splined to said shaft in any one of a plurality of positions.

6. The improvement in a variable speed transmission mechanism in accordance with claim 4, comprising in addition a collar for holding said other end of said torsional spring, and means securing said collar against rotation in respect to said shaft, and wherein said means for adjustably predetermining the initial torsion of said torsional spring comprises a plurality of spring-end-receiving recesses formed in said collar and disposed at different positions around the axis of said shaft, in any one of which recesses said other end of said torsional spring may be positioned.

7. The improvement in a variable speed transmission mechanism in accordance with claim 4, comprising in addition, a collar for holding said other end of said torsional spring, means for preventing rotation of said collar in respect to said shaft, and wherein said means for adjustably predetermining the initial torsion of said torsional spring comprises a plurality of spring-end-receiving recesses in said annular nut, in any one of which the first named end of said torsional spring may be located.

8. The improvement in a variable speed transmission mechanism in accordance with claim 4, comprising in addition, a collar for holding said other end of said torsional spring, means for preventing relative rotation between said collar and said shaft, and wherein the means for adjustably predetermining the initial torsion of said torsional spring comprises an annular series of spring-end-receiving recesses in said nut and an annular series of spring-end-receiving recesses in said collar, in any one of each of said two series of recesses the opposite ends of said torsional spring may be located.

9. The improvement in a variable speed transmission mechanism in accordance with claim 4, comprising in addition, a collar for holding said other end of said torsional spring, means for preventing relative rotation between said collar and said shaft, wherein the means for adjustably predetermining the initial torsion of said torsional spring comprises an annular series of spring-end-receiving recesses in said nut, and an annular series of spring-end-receiving recesses in said collar, in any one of each of said two series of recesses the opposite ends of said torsional spring may be located, and wherein the numbers of the recesses in said two annular series are prime to one another so as to afford a number of different adjustments of the torsion of said torsional spring substantially equal to the product of these two numbers.

10. The improvement in a variable speed transmission mechanism in accordance with claim 4, comprising in addition, a collar for holding said other end of said torsional spring, a uniform annular series of spline means for securing said collar against rotation in respect to said shaft, and wherein said means for adjustably predetermining the initial torsion of said torsional spring comprises the provision of a plurality of spline means as aforesaid so constructed and arranged that said collar may be placed upon said shaft in a plurality of different angular positions, and an annular series of spring-end-receiving recesses in said nut, one end of said torsional spring being received in any one of said recesses in said nut and the other end carried by said collar, and wherein the number of different possible angular positions of said collar on said shaft and the number of said recesses are prime to one another.

11. The improvement in a variable speed transmission mechanism in accordance with claim 4, comprising in addition, a collar for holding said other end of said torsional spring, and spline means for securing said collar against rotation in respect to said shaft, and wherein said means for adjustably predetermining the initial torsion of said torsional spring comprises the provision as said spline means of a plurality of equiangularly disposed splines between said collar and said shaft for non-rotatably securing said collar on said shaft in any one of a plurality of different positions, an annular series of spring-end-receiving recesses in said nut, and an annular series of spring-end-receiving recesses in said collar, whereby the initial torsion of said torsional spring may be selectively predetermined in an adjustable manner by selectively placing one end in any one of the series of recesses in said nut and the other end in any one of the series of recesses in said collar, and by the selected angular position of said collar on said shaft.

12. In a variable speed transmission mechanism of the type having coaxial driving and driven discs and precessing rollers therebetween for transmission of power at variable speed, and having a driving shaft secured to at least one of said discs and a coaxial housing arranged by relative axial movement in respect to said shaft to provide thrust pressure required for the effective functioning of said transmission mechanism, the improvement which comprises, means tending to move said shaft axially in respect to said housing including a plurality of dished Belleville washers arranged concentric with said shaft and intermediate a nut thereon and a part axially stationary in respect to said housing, means for limiting the compression of said Belleville washers so as to limit the compressive force thereof to a value substantially to provide no-load thrust requirement for such mechanism, the last named means comprising the annular collar of a predetermined length interposed between said nut and a part axially stationary in respect to said housing, an annular nut threaded on said shaft, at least one Belleville washer spring interposed between said nut and a part axially stationary in respect to said housing, a collar splined on said shaft and arranged to be associated therewith in any one of a plurality of angularly different positions, an annular series of spring-end-receiving recesses in said collar, an annular series of spring-end-receiving recesses in said nut, a torsional spring having its ends respectively disposed in one of each of said series of recesses, the number of said recesses of each series being prime to one another, so as to afford a substantial number of different adjustments for the initial torsion of said torsional spring, said torsion spring being so constructed and arranged that it tends to rotate said nut in a direction to increase the compressive force effective thereby upon its associated Belleville washer spring and to take up upon the adjustment of the compression of the spring associated with said nut upon the wearing of the parts of said transmission mechanism.

FRANK A. HAYES.

REFERENCES CITED

The following references are of record in the file of this patent:

UNITED STATES PATENTS

| Number | Name | Date |
|---|---|---|
| Re. 20,801 | Gove et al. | July 19, 1938 |

Certificate of Correction

Patent No. 2,445,066.

July 13, 1948.

FRANK A. HAYES

It is hereby certified that error appears in the printed specification of the above numbered patent requiring correction as follows: Column 7, line 35, for "and-receiving" read *end-receiving*; and that the said Letters Patent should be read with this correction therein that the same may conform to the record of the case in the Patent Office.

Signed and sealed this 23rd day of November, A. D. 1948.

[SEAL]

THOMAS F. MURPHY,
*Assistant Commissioner of Patents.*